United States Patent
Kale et al.

(10) Patent No.: US 8,296,486 B2
(45) Date of Patent: Oct. 23, 2012

(54) PERIPHERAL DEVICE ENABLING ENHANCED COMMUNICATION

(75) Inventors: Shreyas Abhay Kale, Morrisville, NC (US); Julie Morris, Raleigh, NC (US); Justin Monroe Pierce, Cary, NC (US); Richard W. Vanderpool, III, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 190 days.

(21) Appl. No.: 12/049,467

(22) Filed: Mar. 17, 2008

(65) Prior Publication Data

US 2009/0234977 A1    Sep. 17, 2009

(51) Int. Cl.
*G06F 3/00* (2006.01)
*G06F 13/12* (2006.01)
*G06F 13/38* (2006.01)

(52) U.S. Cl. ............................................ 710/74; 710/21
(58) Field of Classification Search ...................... 710/74
See application file for complete search history.

(56) References Cited

U.S. PATENT DOCUMENTS

| | | | | |
|---|---|---|---|---|
| 7,281,169 B2 * | 10/2007 | Golasky et al. | ................. | 714/43 |
| 7,370,166 B1 * | 5/2008 | Ramesh et al. | ................ | 711/163 |
| 2006/0107124 A1 * | 5/2006 | Yagi | ................ | 714/50 |
| 2007/0124551 A1 * | 5/2007 | Taninaka | ....................... | 711/161 |
| 2008/0028146 A1 * | 1/2008 | Dan et al. | ....................... | 711/115 |
| 2008/0071948 A1 * | 3/2008 | James et al. | ..................... | 710/62 |

OTHER PUBLICATIONS

Bix International, Inc.; http://www.bixnet.com/18pocusbpore.html; 40GB-250 GB USB2.0 PocketSize External Hard Drive. Bix Computers. 5 pages printed on May 13, 2008.

* cited by examiner

*Primary Examiner* — Kris Rhu

(74) *Attorney, Agent, or Firm* — Thomas Tyson; Jeffrey L. Streets

(57) ABSTRACT

An apparatus comprising a single memory device providing data storage, a controller for controlling data transfer to and from the data storage, and first and second bus connector plugs, wherein each plug has contacts for connecting with the power, ground, and data contacts of a port of a host system. The power and ground contacts of the first and second plugs are coupled together to provide power to the apparatus through either or both plugs. Data from either or both plugs is communicated with the controller depending upon which plugs are coupled to a port. The controller is responsible for controlling the read and write operations of the data storage. The apparatus may be any type of external memory device, such as a flash drive, or a peripheral device having a high data transfer rate, such as a digital video camera.

21 Claims, 3 Drawing Sheets

PERIPHERAL DEVICE ENABLING ENHANCED COMMUNICATION

BACKGROUND OF THE INVENTION

1. Field of the Invention

The present invention relates to a peripheral device that communicates over a peripheral bus, such as a flash memory device.

2. Description of the Related Art

A universal serial bus (USB) is a serial bus standard to interface devices. USB was designed to allow peripherals to be connected using a single standardized interface socket and to improve plug-and-play capabilities by allowing devices to be connected and disconnected without rebooting the computer. Other convenient features include providing power to low-consumption devices without the need for an external power supply and allowing many devices to be used without requiring manufacturer specific, individual device drivers to be installed. USB is intended to help retire all legacy varieties of serial and parallel ports. USB can connect computer peripherals such as mouse devices, keyboards, PDAs, gamepads and joysticks, scanners, digital cameras, printers, personal media players, and flash drives. For many of those devices USB has become the standard connection method.

A USB system has an asymmetric design, consisting of a host, a multitude of downstream USB ports, and multiple peripheral devices connected in a tiered-star topology. USB devices are linked in series through hubs. There always exists one hub known as the root hub, which is built-in to the host controller. Additional USB hubs may be included in the tiers, allowing branching into a tree structure. A USB host may have multiple host controllers and each host controller may provide one or more USB ports.

A single physical USB device may consist of several logical sub-devices that are referred to as device functions, because each individual device may provide several functions, such as a webcam (video device function) with a built-in microphone (audio device function). USB endpoints actually reside on the connected device and the logical channels for communication with the host are referred to as pipes. Pipes are connections from the host controller to a logical entity on the device named an endpoint. Each endpoint can transfer data in one direction only, either into or out of the device, so each pipe is uni-directional. Endpoints are grouped into interfaces and each interface is associated with a single device function. An exception to this is endpoint zero, which is used for device configuration and which is not associated with any interface.

When a new USB device is connected to a USB host, the USB device enumeration process is started. The enumeration process first sends a reset signal to the USB device. The speed of the USB device is determined during the reset signaling. After reset, USB device setup information is read from the device by the host and the device is assigned a unique host-controller specific 7-bit address. If the device is supported by the host, the device drivers needed for communicating with the device are loaded and the device is set to a configured state. If the USB host is restarted, the enumeration process is repeated for all connected devices.

The host controller polls the bus for traffic, usually in a round-robin fashion, so that no USB device can transfer any data on the bus without an explicit request from the host controller. Devices that attach to the bus can be specialized devices requiring a device-specific device driver to be used, or may belong to a device class. These device classes define an expected behavior in terms of device and interface descriptors so that the same device driver may be used for any device that claims to be a member of a certain class. An operating system is supposed to implement all device classes so as to provide generic drivers for many USB devices.

USB standards generally support three data rates. A Low Speed rate of 1.5 Mbit/s (187 kB/s) is mostly used for Human Interface Devices (HID) such as keyboards, mice, and joysticks (available under USB Specifications 1.1 and 2.0). A Full Speed rate of 12 Mbit/s (1.5 MB/s) (available under USB Specifications 1.1 and 2.0) divides its USB bandwidth between USB devices in a first-come first-served basis. A Hi-Speed rate of 480 Mbit/s (60 MB/s) is currently the fastest speed in use (available only under USB Specification 2.0).

BRIEF SUMMARY OF THE INVENTION

One embodiment of the invention provides an apparatus comprising one physical memory device having data storage, a controller for controlling data transfer to and from the data storage, and a plurality of bus connector plugs. Each plug has contacts for connecting with the power, ground, and two data contacts of an independent port of a host system. The power and ground contacts of each of the plurality of plugs are coupled together. The two data contacts of each plug communicate with the controller. Optionally, the data storage may be divided into a plurality of logical storage devices.

Another embodiment of the invention provides a method for a host computer system to communicate with a memory device. The method includes providing a memory device having first and second plugs, wherein each plug has contacts for selectively receiving power and communicating data with a host computer system. Power is supplied to the memory device in response to either or both of the first and second plugs being coupled to a port of the host computer system. The host computer system selectively communicates with the memory device over the first and second plugs in response to both of the first and second memory device plugs being coupled to a port of the host computer, and the host computer system selectively communicates with the memory device over the first plug in response to the first plug being coupled to a port of the host computer system without the second plug being coupled to a port of the host computer system.

Other embodiments, aspects, and advantages of the invention will be apparent from the following description and the appended claims.

DETAILED DESCRIPTION OF THE INVENTION

Figure 1A:
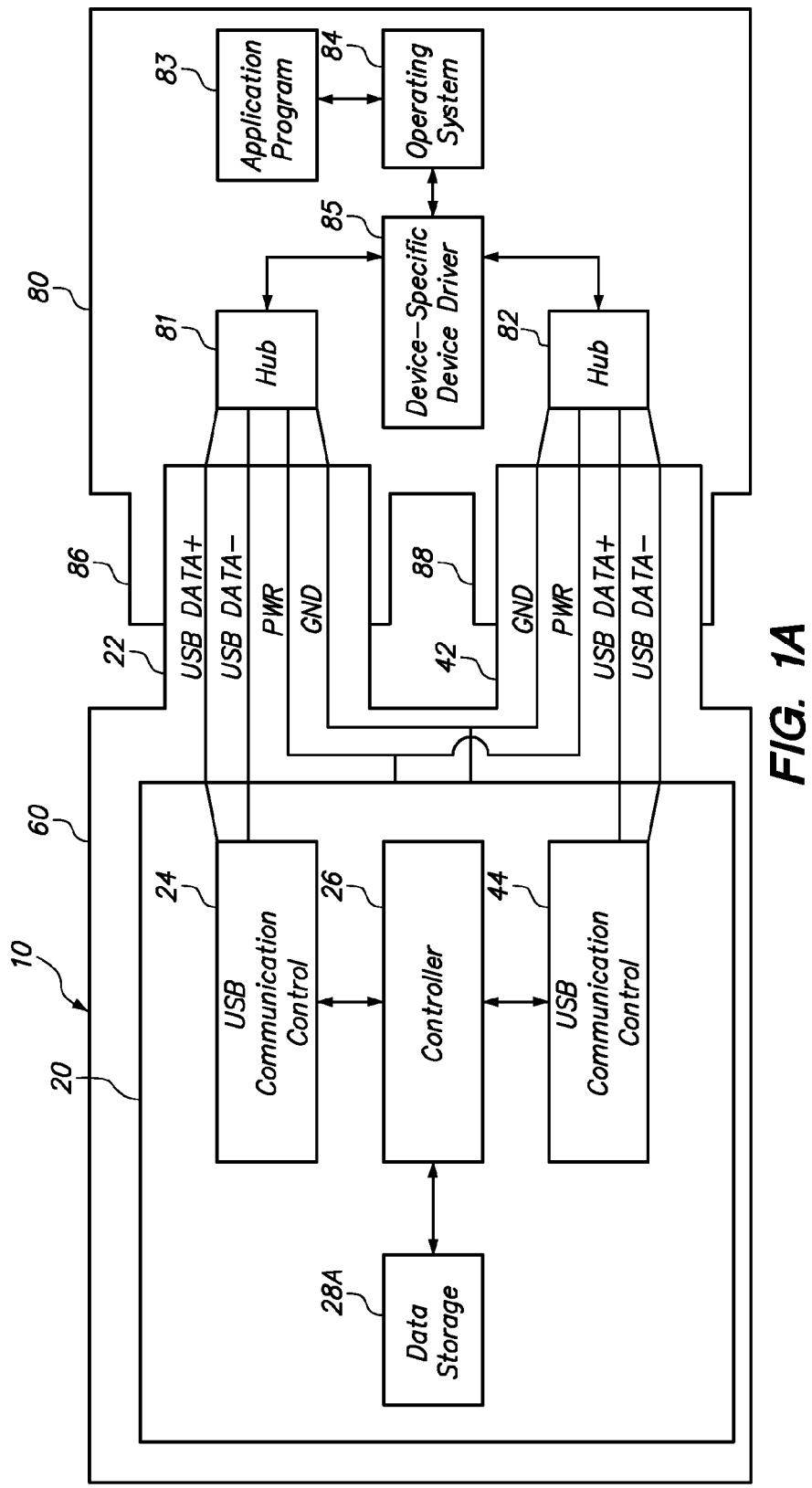
FIG. 1A is a diagram of a memory device including a single data storage device, such as a flash drive, and two plugs for coupling to ports of a host computer system.

One embodiment of the invention provides an apparatus comprising a single memory device providing data storage, a controller for controlling data transfer to and from the data storage, and first and second bus connector plugs, each plug having contacts for connecting with the power, ground, and data contacts of a port of a host system, wherein the power and ground contacts of the first and second plugs are coupled together, and wherein the data contacts of the each plug communicate with the controller. Optionally, the data storage may be divided into a plurality of logical drives, wherein the controller communicates data between each bus connector plug and a separate one of the logical drives. The memory device may be any type of external memory device, such as a flash drive, or a peripheral device having a high data transfer rate, such as a digital video camera.

Optionally, the apparatus may further include a communication controller for handling communication between the controller and the host device via the first and second plugs. Preferably, the apparatus includes first and second communication controllers for handling communication between the controller and the host device via the first and second plugs, respectively. A communication controller is a generic hardware component that controls the processing of the physical layer of USB communication. Although this component is useful, these functions may alternatively be performed by the controller.

The apparatus may be plugged into a host computer system for communication there between. For example, where the apparatus is a USB device, such as a flash memory drive, each plug of the device receives a PWR, GND, DATA+ and DATA− signal from a unique USB port of the host. The controller may communicate with the host computer system through one or more pathways depending upon the number of plugs that are connected into ports of the host computer system. The controller, flash memory drive and other components, such as the optional communication controller, receive power through the PWR and GND lines so long as at least one plug is plugged into a port. Each of the PWR lines and each of the GND lines are preferably coupled together to provide a common reference voltage.

The apparatus may be any available type of peripheral device that would benefit from additional throughput of data, such as a data storage device, network device, multimedia or video device, and the like. In embodiments where the peripheral is a memory device that stores the data, such as where the peripheral device is a flash drive, the data may later be read from the memory device and communicated from the memory device to the operating system. Specifically, the data may be communicated from the memory device to the operating system by sequentially directing portions of the data through the plurality of hubs.

The apparatus may be plugged into a host computer system using one USB connection or, with the use of a device-specific device driver, using two USB connections. A device-specific device driver is provided for presenting the apparatus as a single logical device, yet sending and receiving data over two USB ports to the apparatus. Accordingly, the speed by which data can be communicated with the apparatus may be increased. Optionally, the device-specific driver may cause block-level striping of the data between separate logical drives, wherein the device-specific device driver directs the two USB ports to send or receive data block-by-block, alternating between the logical drives.

The device-specific device driver is a computer program allowing the operating system or other higher-level computer program or application to communicate with a specific USB device. When a calling program invokes a routine in the driver, the driver issues one or more commands to the device. Once the device provides identifying information to the device-specific device driver, the driver may invoke routines in the original calling program. The device-specific driver is hardware-dependent and specific to the operating system. The driver accepts generic instructions from the calling program and converts them into low-level commands required by the device. Optionally, the device-specific driver will provide the interrupt handling required for any necessary asynchronous time-dependent hardware interface.

The device-specific driver is preferably a loadable device driver that is loaded in response to detecting that the apparatus has been coupled to one or more USB ports. For example, the device enumeration process provides the host with information about each coupled device. Most preferably, the device-specific driver will transition between a first mode of operating the apparatus over a single hub and a second mode of operating the apparatus over a plurality of hubs. Optionally, the device-specific driver may perform steps in the second mode for controlling the operation of the apparatus over the plurality of hubs with data striping between the logical memory drives. Still further, the device-specific driver may access data at any location within the data storage of the apparatus by communicating with the controller, even if only one of the plugs is directly plugged into the host device.

In accordance with a further embodiment of the invention, the device-specific device driver presents the USB device to the operating system as a single logical device, yet sends commands and data to the USB device through independent instances of the host controller and hub. Optionally, the device driver may be abstracted into logical and physical layers. For example, the logical layer may process the operating system instructions and divide the data into stripes for sending to independent host controllers. The physical layer may then generate appropriate low-level commands that are device-specific and sequentially transfer data blocks to different instances of the host controller and hub. Conversely, when the hardware device needs to respond to the operating system, it uses the physical layer of the driver to communicate with the logical layer of the driver.

A typical USB root hub follows a USB communication protocol that limits the rate of data transfer. For example, the current USB 2.0 protocol limits data transfer to 480 Mbps. When the apparatus is coupled to two independent root hubs operating at this speed, one embodiment of the invention approaches an effective speed of about 960 Mbps. For example, a device-specific device driver for a USB flash drive will accept a request from the operating system to write data to the USB flash drive. In a data striping embodiment, the device-specific device driver may divide the data stream into stripes of data blocks, and sequentially send each block to one of the USB root hubs that are in communication with the two memory devices. The operating system and/or the device-specific device driver buffers data for the hubs in order to keep them each busy until the data transfer is completed. Accordingly, the data transfer rate to the apparatus, such as a flash drive, is increased by transferring data through two USB root hubs. However, data transfer rate to the apparatus over a single plug would be expected to be about the same speed as a conventional memory device.

In a further embodiment, the first and second memory devices are physically secured together so that the plug of the first memory device is disposed in parallel with the plug of the second memory device. Furthermore, the apparatus may include a housing that secures and contains the memory device, the controller and any other components of the apparatus.

FIG. 1 is a diagram of an apparatus 10 including a memory device 20 secured within a housing 60 and first and second plugs 22, 42 securely extending from the housing 60. The first and second plugs 22, 42 are selectively coupled to two USB ports 86, 88 a host computer system 80. A common reference voltage is achieved by coupling the two PWR lines and the two GND lines and providing power to the electronic components of the apparatus 10. The DATA+ and DATA− signals from each plug 22, 42 are communicated to separate USB communication controllers 24, 44, respectively. These USB communication controllers 24, 44 manage communications between the respective hubs 81, 82 and the controller 26. The controller 26 communicates directly with the data storage device 28A in order to complete read and write operations routed through either hub/USB communication control system pair. The USB communication control device is a generic hardware component that controls the processing of the physical layer of USB communication. Although this component is useful, these functions may alternatively be performed by the controller 26.

The controller 26, such as a microprocessor, receives read and write requests or commands from a device-specific driver 85 and communicates with data storage 28. These read and write requests typically originate from an operating system 84 and/or an application program 83. Furthermore, the controller can be powered and operational regardless of which one or both of the USB plugs 22, 42 are coupled to a host system 80. Like the device-specific driver, the controller can operate in either a first mode over a single plug/port or a second mode over a plurality of plugs/ports to achieve a greater data transfer rate. Accordingly, the apparatus 10 has the ability for either or both plugs to be coupled to a USB port of a host system and still enable the device to read or write data anywhere on the data storage 28A.

Although it is possible for the host system to operate the USB flash memory device in the normal (single plug) mode using a standard driver, it is preferable to load and execute the device-specific driver 85 any time that the device enumeration identifies a connection with a device that may be capable of operating in a multiple port mode. For example, when an apparatus with two plugs is first detected as being coupled to the host system, then the device-specific driver should be loaded. Although the device-specific driver may initially operate in a single port mode, the driver can automatically transition to the multiple port mode upon detecting a further connection of the apparatus with another port.

Figure 1B:
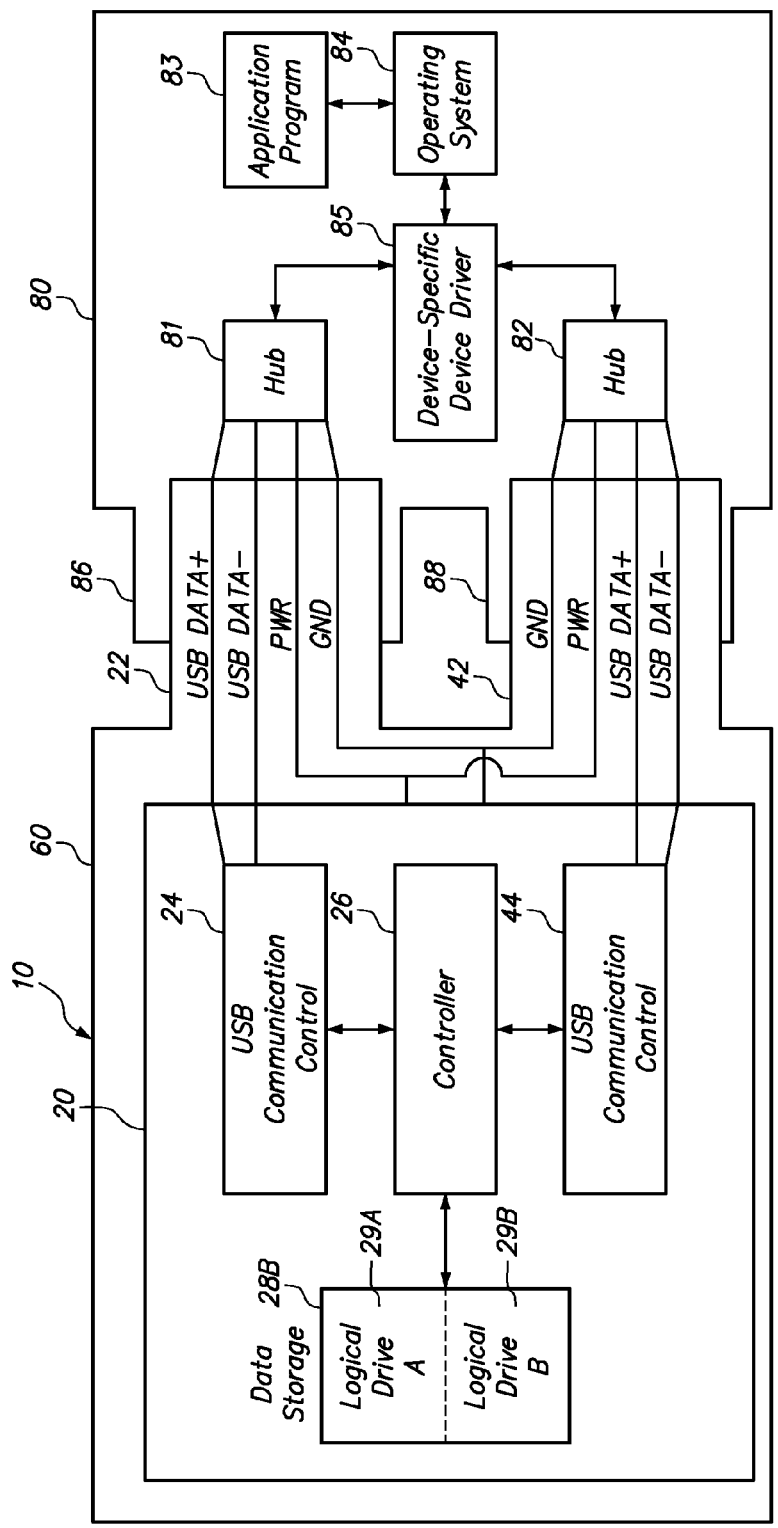
FIG. 1B is a diagram of a memory device including a single data storage device, as shown in FIG. 1A, but with the data storage device divided into two logical drives.

FIG. 1B is a diagram of the memory device 20 including a single data storage device 28B, similar to the data storage device 28A as shown in FIG. 1A, but with the data storage device 28B divided into a plurality of logical drives 29A, 29B. Optionally, the controller 26 may communicate data between each bus connector plug 22, 42 and a separate one of the logical drives 29A, 29B, respectively.

Figure 2:
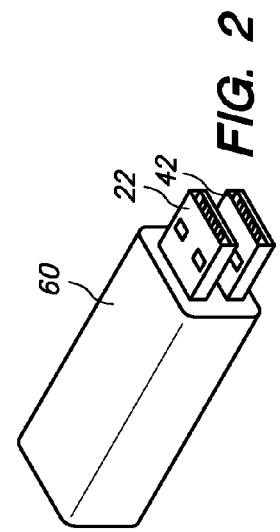
FIG. 2 is a perspective view of a USB flash memory drive housing having two connector plugs.

FIG. 2 is a perspective view of a USB flash memory drive housing 60 having two connector plugs 22, 42. The connector plugs 22, 42 may be selectively coupled to two USB ports (receptacles) having the same spacing. The common housing protects the one or two flash drives (data storage) of the apparatus and includes the interconnections 62, 64, 66 shown in FIG. 1. The common housing 60 also facilitates or simplifies the connection of the apparatus 10 to the host system 80.

Figure 3:
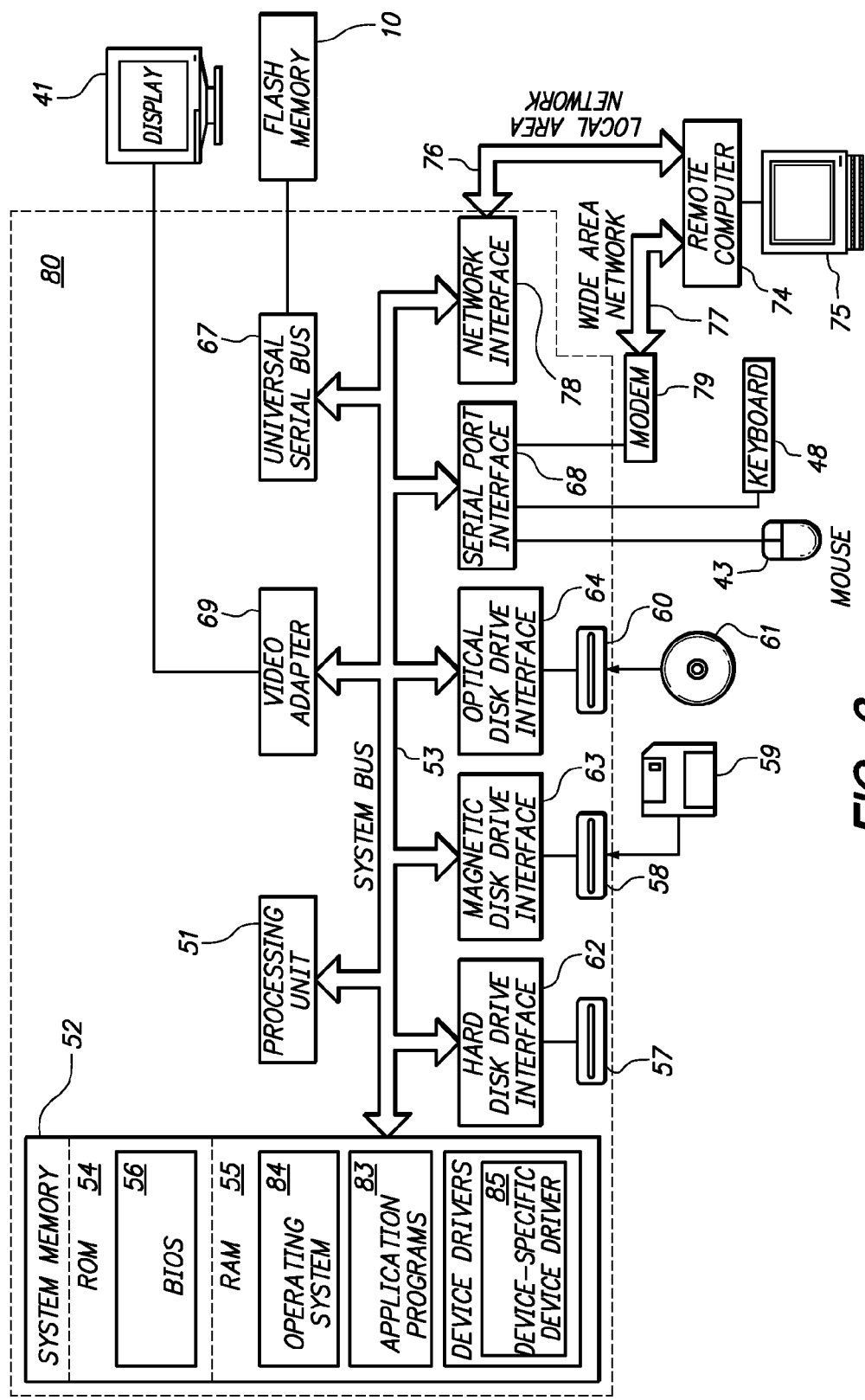
FIG. 3 is a block diagram of an exemplary host computer system.

FIG. 3 is a schematic diagram of an exemplary host computer system 80 in communication with the flash memory apparatus 10 over a universal serial bus 67. The system 80 is shown as a general-purpose computing device in the form of a conventional personal computer, but the system may be in the form of a server or other system having a universal serial bus. Generally, the computer 80 includes a processing unit 51, a system memory 52, and a system bus 53 that couples various system components including the system memory 52 to processing unit 51. System bus 53 may be any of several types of bus structures including a memory bus or memory controller, a peripheral bus, and a local bus using any of a variety of bus architectures. The system memory can include a read-only memory (ROM) 54 and random-access memory (RAM) 55. A basic input/output system (BIOS) 56, containing the basic routines that help to transfer information between elements within computer 80, such as during start-up, can be stored in ROM 54.

Computer 80 further includes a hard disk drive interface 62 for reading from and writing to a logical data storage device 10, a magnetic disk drive 58 for reading from or writing to a removable magnetic disk 59, and an optical disk drive 60 for reading from or writing to a removable optical disk 61 such as a CD-ROM or other optical media. Hard disk drive 57, magnetic disk drive 58, and optical disk drive 60 are connected to system bus 53 by a hard disk drive interface 62, a magnetic disk drive interface 63, and an optical disk drive interface 64, respectively. Although the exemplary environment described herein employs the logical data storage device 10, removable magnetic disk 59, and removable optical disk 61, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment. These storage devices and their associated computer readable media provide nonvolatile storage of computer-executable instructions, data structures, program modules, and other data for the computer 80.

A user may enter commands and information into personal computer 80 through input devices, such as a keyboard 48 and a pointing device, such as a mouse 43. Other input devices (not shown) may include a microphone, joystick, game pad, satellite dish, scanner, or the like. These and other input devices are often connected to processing unit 51 through a serial port interface 68 that is coupled to the system bus 53, but input/output devices may be connected by other interfaces, such as a parallel port, game port, a universal serial bus (USB) 67, IEEE 1394 (Firewire), special adapter, wireless transmission, LAN attachment, an internet connection or the like. A display device 41 may also be connected to system bus 53 via an interface, such as a video adapter 69. In addition to the display device, personal computers typically include other peripheral output devices (not shown), such as speakers and printers.

The computer 80 may operate in a networked environment using logical connections to one or more remote computer 74. The remote computer 74 may be another personal computer, a server, a client, a router, a network PC, a peer device, a mainframe, a personal digital assistant, an Internet-connected mobile telephone, an Internet-connected camera, or other common network node. While a remote computer 74 typically includes many or all of the elements described above relative to the computer 80, only a display and keyboard 75 has been illustrated in the figure. The logical connections depicted in the figure include a local area network (LAN) 76 and a wide area network (WAN) 77. Such networking environments are commonplace in offices, enterprise-wide computer networks, intranets, and the Internet.

When used in a LAN networking environment, the computer 80 is often connected to the local area network 76 through a network interface or adapter 78. When used in a WAN networking environment, the computer 80 typically includes a modem 79 or other means for establishing high-speed communications over WAN 77, such as the Internet. A modem 79, which may be internal or external, is connected to system bus 53 via serial port interface 68. In a networked environment, program modules depicted relative to personal computer 80, or portions thereof, may be stored in the remote memory storage device 75. It will be appreciated that the network connections shown are exemplary and other means of establishing a communications link between the computers may be used. A number of program modules may be stored on one of the data storage devices, ROM 54, or RAM 55, including an operating system 84, an application program 83, and a device-specific device driver 85.

The devices shown in FIG. 3 should not imply that the invention has architectural limitations. For example, those skilled in the art will appreciate that the present invention may be implemented in other computer system configurations, including hand-held devices, multiprocessor systems, microprocessor based or programmable consumer electronics, network personal computers, minicomputers, mainframe computers, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a host computer including a plurality of ports and a processor for running an operating system having device drivers enabling communication over the plurality of ports;
   a physical memory device having a single data storage device, a controller for controlling data transfer to and from the single data storage device, and a plurality of bus connector plugs, each plug having contacts for connecting with the power, ground, and data contacts of an independent port of the host system, wherein the power and ground contacts of each of the plurality of plugs are coupled together to provide power to the controller when any of the bus connector plugs are plugged into one of the plurality of ports, and wherein the data contacts of each plug communicate with the controller.

2. The system of claim 1, wherein the single data storage device is divided into a plurality of logical drives, and wherein the controller communicates data between each bus connector plug and a separate one of the logical drives.

3. The system of claim 1, wherein each of the ports are coupled to separate root hub.

4. The system of claim 1, further comprising:
   a plurality of communication controllers, each communication controller handling communication between the controller and one of the plurality of bus connector plugs.

5. The system of claim 1, wherein each port has two data contacts.

6. The system of claim 5, wherein each port is a universal serial bus port.

7. The system of claim 1, wherein the bus connector plugs are physically secured together in parallel for coordinated insertion into an equal number of ports.

8. The system of claim 1, wherein each port connects to a peripheral bus selected from the group consisting of a universal serial bus, FireWire, Ethernet, RS-232, RS-485, Fibre Channel, PCI Express, Serial Attached SCSI, and Serial ATA.

9. The system of claim 1, wherein the memory device is a flash drive.

10. The system of claim 1, wherein the controller communicates data over the plurality of bus connector plugs by alternatingly directing portions of the data through the plurality of bus connector plugs.

11. The system of claim 1, wherein the bus is a universal serial bus.

12. The system of claim 1, wherein the controller communicates data over each of the plurality of bus connector plugs that are coupled to a port.

13. The system of claim 1, wherein the single data storage device is divided into a plurality of logical drives.

14. The system of claim 13, wherein the controller stripes data across the plurality of logical drives according to which plug communicates the data to the controller.

15. A method, comprising:
   providing a memory device having first and second bus connector plugs and a single data storage device, each plug having contacts for selectively receiving power and communicating data between a host computer system and the single data storage device;
   supplying power to the memory device in response to either or both of the first and second plugs being coupled to a port of the host computer system;
   selectively communicating between the host computer system and the single data storage device over the first and second plugs in response to both of the first and second plugs being coupled to a port of the host computer; and
   selectively communicating between the host computer system and the single data storage device over the first plug in response to the first plug being coupled to a port of the host computer system without the second plug being coupled to a port of the host computer system.

16. The method of claim 15, wherein the single data storage device is divided into a plurality of logical drives, and wherein the host computer communicates data between each bus connector plug and a separate one of the logical drives.

17. The method of claim 15, wherein each port has two data contacts.

18. The method of claim 17, wherein each port is a universal serial bus port.

19. The method of claim 15, wherein the bus connector plugs are physically secured together in parallel for coordinated insertion into an equal number of ports.

20. The method of claim 15, wherein each port connects to a peripheral bus selected from the group consisting of a universal serial bus, FireWire, Ethernet, RS-232, RS-485, Fibre Channel, PCI Express, Serial Attached SCSI, and Serial ATA.

21. The method of claim 15, wherein the memory device is a flash drive.

* * * * *